(12) United States Patent
Abe et al.

(10) Patent No.: US 10,676,365 B2
(45) Date of Patent: Jun. 9, 2020

(54) HYDROGENATED SILANE COMPOSITION

(71) Applicant: NIPPON SHOKUBAI CO., LTD., Osaka (JP)

(72) Inventors: Takashi Abe, Osaka (JP); Tatsuhiko Akiyama, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 16/110,345

(22) Filed: Aug. 23, 2018

(65) Prior Publication Data

US 2019/0135641 A1 May 9, 2019

(30) Foreign Application Priority Data

Aug. 31, 2017 (JP) .................. 2017-167649

(51) Int. Cl.
*C01B 33/04* (2006.01)

(52) U.S. Cl.
CPC .......... *C01B 33/04* (2013.01); *C01P 2006/80* (2013.01)

(58) Field of Classification Search
CPC .............................. C01B 33/04; C01P 2006/80
See application file for complete search history.

(56) References Cited

U.S. PATENT DOCUMENTS

| | | | |
|---|---|---|---|
| 4,554,180 A | 11/1985 | Hirooka | |
| 2012/0003819 A1 | 1/2012 | Francis et al. | |
| 2012/0024223 A1 | 2/2012 | Torres, Jr. et al. | |
| 2014/0219893 A1* | 8/2014 | Imoto | C01B 33/04 423/210 |
| 2016/0311692 A1 | 10/2016 | Kitamura et al. | |

FOREIGN PATENT DOCUMENTS

| | | |
|---|---|---|
| JP | 60-26664 | 2/1985 |
| JP | 2013-187261 | 9/2013 |
| JP | 2013-537705 | 10/2013 |
| JP | 2015-134755 | 7/2015 |

* cited by examiner

*Primary Examiner* — Amber R Orlando
*Assistant Examiner* — Syed T Iqbal
(74) *Attorney, Agent, or Firm* — Wenderoth, Lind & Ponack, L.L.P.

(57) ABSTRACT

At least one embodiment of the present disclosure provides a hydrogenated silane composition containing cyclohexasilane of a cyclic hydrogenated silane having high storage stability.

The at least one embodiment of the present disclosure relates to a hydrogenated silane composition, wherein a content ratio of normal hexasilane and silylcyclopentasilane to cyclohexasilane is 0.0020 or less on a mass basis.

8 Claims, No Drawings

HYDROGENATED SILANE COMPOSITION

BACKGROUND OF THE INVENTION

Field of the Invention

This application claims the benefit of priority based on Japanese Patent Application No. 2017-167649, filed on Aug. 31, 2017. The entire content of the specification of Japanese Patent Application No. 2017-167649, filed on Aug. 31, 2017, is incorporated into this application by reference.

At least one embodiment of the present disclosure relates to a hydrogenated silane composition. Specifically, at least one embodiment of the present disclosure relates to the hydrogenated silane composition containing normal hexasilane of a linear hydrogenated silane and silylcyclopentasilane of a cyclic hydrogenated silane having a branched structure.

Description of Related Art

A silicon thin film has been used for applications such as solar cells and semiconductors, and this silicon thin film has been previously prepared by a vapor deposition film-forming method (CVD method) using monosilane as a raw material. In addition, other reported methods for preparing silicon thin films include a CVD method using as a raw material a cyclic silane compound represented by a general formula $(SiH_2)_n$ (n=4, 5, or 6) (Patent Document 1), a CVD method using as a raw material cyclohexasilane (Patent Document 2), a method for producing a polysilane by forming a layer composed of a solution containing as a solute cyclopentasilane and cyclohexasilane on a substrate, and carrying out photopolymerization (Patent Document 3), and the like.

As a method for preparing a cyclic hydrogenated silane, Patent Document 4 discloses a method for preparing a cyclic hydrogenated silane in which a cyclization reaction of a halosilane is carried out under the presence of a given coordination compound to obtain a neutral complex of a cyclic halogenated silane, and the neutral complex of a cyclic halogenated silane is reduced to prepare the cyclic hydrogenated silane.

PRIOR ART DOCUMENTS

Patent Documents

Patent Document 1: Japanese unexamined patent application publication No. 1985-26664
Patent Document 2: Japanese unexamined patent application publication No. 2013-537705
Patent Document 3: Japanese unexamined patent application publication No. 2013-187261
Patent Document 4: Japanese unexamined patent application publication No. 2015-134755

SUMMARY OF THE INVENTION

Problems to be Solved by the Invention

Thus, the cyclic hydrogenated silane, particularly cyclohexasilane frequently has been used as film-forming materials of semiconductors in many years, and cyclohexasilane of the cyclic hydrogenated silane having the storage stability has been required in the viewpoint of obtaining the uniform film as films suitably used in the semiconductors.

For example, in the case where a composition containing cyclohexasilane contains normal hexasilane of a linear hydrogenated silane and silylcyclopentasilane of a cyclic hydrogenated silane having a branched structure in a large amount even if the number of the silicon atoms is the same between these, this may have an influence on vaporization of cyclohexasilane due to different vaporization pressure, so that there is the need to control a ratio of normal hexasilane and silylcyclopentasilane.

In addition, when the hydrogenated silane composition containing cyclohexasilane contains normal hexasilane of the linear hydrogenated silane and silylcyclopentasilane of the cyclic hydrogenated silane having a branched structure in a large amount, the stability of cyclohexasilane tends to decrease. For example, in silylcyclopentasilane of the cyclic hydrogenated silane having a branched structure, a bond between a silyl group at a side chain and cyclopentasilane backbone is easily broken, so that a degradation of cyclohexasilane tends to be caused.

On the other hand, as described in Patent Document 3, when the polysilane is produced with photopolymerization, there is the need to control easily decomposable silylcyclopentasilane in order to initiate and promote the photopolymerization.

Therefore, there is the need to control a ratio of normal hexasilane of the linear hydrogenated silane and silylcyclopentasilane of the cyclic hydrogenated silane having a branched structure contained in the hydrogenated silane composition containing cyclohexasilane in the viewpoints of the stability and the polymerization reactivity.

The object of at least one embodiment of the present disclosure is to provide a hydrogenated silane composition containing cyclohexasilane of a cyclic hydrogenated silane having high storage stability.

Solutions to the Problems

The hydrogenated silane composition of at least one embodiment of the present disclosure is characterized in that a content ratio of normal hexasilane and silylcyclopentasilane to cyclohexasilane is 0.0020 or less on a mass basis.

Effects of the Invention

According to the present disclosure, the storage stability of cyclohexasilane of the cyclic hydrogenated silane can be improved.

MODE FOR CARRYING OUT THE INVENTION

The hydrogenated silane composition of the present disclosure is characterized in that a content ratio of normal hexasilane and silylcyclopentasilane to cyclohexasilane is 0.0020 or less on a mass basis.

The content ratio of normal hexasilane and silylcyclopentasilane to cyclohexasilane is 0.0020 or less, preferably 0.0018 or less, more preferably 0.0016 or less, and even preferably 0.0014 or less on a mass basis. The content ratio may be 0 or more, 0.00001 or more or 0.00005 or more.

When the above content ratio is satisfied, as mentioned below, the storage stability of cyclohexasilane is improved because a content of the linear hydrogenated silane and the cyclic hydrogenated silane having a branched structure are reduced as possible as. In addition, the stability on the film formation with the liquid phase is also improved.

The content ratio of normal hexasilane and silylcyclopentasilane to cyclohexasilane can be determined based on gas chromatograms obtained in the following gas chromatography conditions and the following formula (1).

(total area of gas chromatograms of normal hexasilane and silylcyclopentasilane)/(area of gas chromatograms of cyclohexasilane)     (1)

Gas Chromatography Conditions
Device: GC2014 manufactured by Shimadzu Corporation
Detection: FID
Column: Agilent J&W GC column DB-5 ms Phenyl-Arylene polymer, 0.25 μm×0.25 mm×30 m
Temperature of vaporization chamber: 250° C.
Temperature of detector: 280° C.
Temperature elevating conditions: 1) at 50° C. for 5 minutes, 2) elevation of temperature up to 250° C. at a temperature elevating rate of 20° C./minute, 3) elevation of temperature up to 280° C. at a temperature elevating rate of 10° C./minute, and 4) at 280° C. for 10 minutes The area of the gas chromatograms means a total area of the cyclic hydrogenated silane or the linear hydrogenated silane obtained in gas chromatography conditions. A ratio of each of the cyclic hydrogenated silanes and each of the linear hydrogenated silanes may be determined from the area of the gas chromatograms.

The purity of the cyclic hydrogenated silane or the linear hydrogenated silane may be determined using a calibration curve method (mesitylene as a standard material) in place of a percentage method using an area of gas chromatograms.

The hydrogenated silane composition of the present disclosure may be those obtained by preparing cyclohexasilane of the cyclic hydrogenated silane, those obtained by solid-liquid separation of cyclohexasilane, and those obtained by distilling cyclohexasilane. In addition, in the case where the cyclic hydrogenated silane or the linear hydrogenated silane other than cyclohexasilane is prepared, those satisfying the above content ratio are included in the hydrogenated silane composition of the present disclosure. Therefore, the hydrogenated silane composition of at least one embodiment of the present disclosure may contain a cyclic hydrogenated silane other than cyclohexasilane and silylcyclopentasilane and a linear hydrogenated silane other than normal hexasilane as long as the content ratio is satisfied.

A content of cyclohexasilane is preferably 97% by mass or more, more preferably 97.5% by mass or more, even preferably 98.0% by mass or more per 100% by mass of the hydrogenated silane composition, and a content of cyclohexasilane is desirably and extremely near 100% by mass, and may be 99.9% by mass or less or 99.7% by mass or less per 100% by mass of the hydrogenated silane composition.

Normal hexasilane is, for example, a compound represented by the following formula (1).

[Chemical Formula 1]

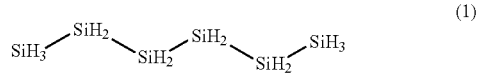
    (1)

A content of normal hexasilane is preferably 0.5% by mass or less, more preferably 0.4% by mass or less, even preferably 0.3% by mass or less, and preferably 0.0001% by mass or more or 0.001% by mass or more per 100% by mass of the hydrogenated silane composition.

Silylcyclopentasilane is, for example, a compound represented by the following formula (2).

[Chemical Formula 2]

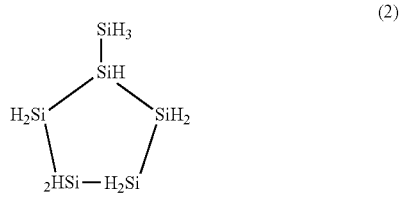
    (2)

A content of silylcyclopentasilane is preferably 0.0001% to 0.5% by mass, more preferably 0.005% to 0.4% by mass, and even preferably 0.01% to 0.3% by mass per 100% by mass of the hydrogenated silane composition.

A total content of normal hexasilane and silylcyclopentasilane is preferably 0.0002% to 0.6% by mass, more preferably 0.01% to 0.5% by mass, and even preferably 0.02 to 0.4% by mass per 100% by mass of the hydrogenated silane composition.

In at least one embodiment of the present disclosure, in the case where the hydrogenated silane composition (preferably cyclohexasilane) is prepared through a given heat treatment, the content of the linear hydrogenated silane (normal hexasilane) and the cyclic hydrogenated silane having a branched structure (silylcyclopentasilane) is increased, so that the storage stability of cyclohexasilane cannot be improved sufficiently in some cases.

In at least one embodiment of the present disclosure, using an appropriate method, the hydrogenated silane composition can be obtained by decreasing a content of the linear hydrogenated silane (normal hexasilane) and the cyclic hydrogenated silane having a branched structure (silylcyclopentasilane) from the hydrogenated silane composition containing cyclohexasilane obtained in various methods. A method for preparing the hydrogenated silane composition containing cyclohexasilane before decreasing the content of the linear hydrogenated silane and the cyclic hydrogenated silane having a branched structure is not limited particularly, and various known methods can be used. Among these, a method for reducing a cyclic halosilane obtained from the cyclization of a halosilane is suitable.

Examples of the halosilane (the halogenated silane) include dihalogenated silanes such as dichlorosilane, dibromosilane, diiodosilane, difluorosilane; trihalogenated silanes such as trichlorosilane, tribromosilane, triiodosilane and trifluorosilane; and tetrahalogenated silanes such as tetrachlorosilane, tetrabromosilane, tetraiodosilane and tetrafluorosilane. Among these, trihalogenated silanes are preferable, and trichlorosilane is particularly preferable.

A method for cyclizing the halosilane is not limited particularly, and the following method (A) or (B) is preferred.

(A) a method for obtaining a salt of a cyclic halosilane by contacting a halosilane (a halogenated monosilane) with a phosphonium salt and/or an ammonium salt [hereinafter, referred to as method A in some cases]

(B) a method for obtaining a neutral complex of a cyclic halosilane by contacting a halosilane with at least one compound selected from the group consisting of the following (I) and (II) [hereinafter, referred to as method B in some cases]

(I) a compound represented as $XR_n$ [hereinafter, referred to as compound I in some cases] (when X is P or P=O, n=3 and each R represents a substituted or unsubstituted alkyl group or aryl group and each R is the same or different; when X is S, S=O or O, n=2 and each R represents a substituted or unsubstituted alkyl group or aryl group and each R is the same or different; when X is CN, n=1 and each R represents a substituted or unsubstituted alkyl group or aryl group, and the number of amino groups in $XR_n$ is 0 or 1)

(II) at least one heterocyclic compound selected from the group consisting of substituted or unsubstituted N-, O-, S- or P-containing heterocyclic compounds that have an unshared electron pair in the ring [hereinafter, referred to as compound II in some cases] (the number of tertiary amino groups as the substituent of the heterocyclic compound is 0 or 1).

First, the above method A is explained.

The phosphonium salt is preferably a quaternary phosphonium salt, and preferably includes a salt represented by the following general formula (11). In the following formula (11), each of $R^1$ to $R^4$ may different, and all of $R^1$ to $R^4$ is preferably the same group.

[Chemical Formula 3]

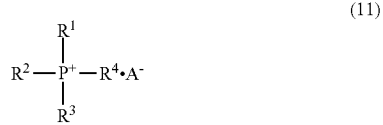

(11)

In addition, the ammonium salt is preferably a quaternary ammonium salt, and preferably includes a salt represented by the following general formula (12). In the following formula (12), each of $R^5$ to $R^8$ may different, and all of $R^5$ to $R^8$ is preferably the same group.

[Chemical Formula 4]

(12)

In the above formulas (11) and (12), $R^1$ to $R^4$ and $R^5$ to $R^8$ each independently represent a hydrogen atom, an alkyl group or an aryl group; and $A^-$ represents a monovalent anion.

The examples of alkyl groups of $R^1$ to $R^4$ and $R^5$ to $R^8$ preferably include linear alkyl groups such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group; cyclic alkyl groups such as a cyclopropyl group, a cyclobutyl group, a cyclopentyl group, a cyclohexyl group, and a cycloheptyl group. The alkyl groups have carbon atoms of preferably 1 to 16, and more preferably 1 to 8.

The examples of the aryl groups of $R^1$ to $R^4$ and $R^5$ to $R^8$ preferably include aryl groups having a carbon number of 6 to 18 such as a phenyl group and a naphthyl group. The aryl groups of $R^1$ to $R^4$ and $R^5$ to $R^8$ are more preferably an aryl group having a carbon number of 6 to 12.

Each of $R^1$ to $R^4$ and $R^5$ to $R^8$ is preferably an alkyl group or an aryl group, and more preferably an aryl group. When $R^1$ to $R^4$ and $R^5$ to $R^8$ are aryl groups, as set forth below, a salt of a cyclic halosilane is easily obtained at high purity because the salt of the cyclic halosilane is precipitated in a reaction solution in the preparation of salt of the cyclic halosilane.

In the above formulas (11) and (12), the monovalent anion represented by $A^-$ includes halide ions ($Cl^-$, $Br^-$, $I^-$, and the like), borate ions ($BF_4^-$ and the like), and phosphorous anions ($PF_6^-$ and the like). Among them, halide ions are preferable, $Cl^-$, $Br^-$ and $I^-$ are more preferable, and $Cl^-$ and $Br^-$ are particularly preferable, from the viewpoint of easy availability.

One or both of the phosphonium salt and the ammonium salt may be used. The phosphonium salt may be used individually or in two or more phosphonium salts. The ammonium salt may be used individually or in two or more ammonium salts. In addition, the phosphonium salt and the ammonium salt may be generated from a corresponding tertiary phosphine and tertiary amine in a reacting system.

The amount of the phosphonium salt and/or the ammonium salt to be used or the total amount thereof in the case where two or more kinds are used is preferably not less than 0.01 mol, more preferably not less than 0.05 mol, further preferably not less than 0.08 mol, and preferably not more than 1.0 mol, more preferably not more than 0.7 mol, and further preferably not more than 0.5 mol, based on 1 mol of the halosilane. When the amount of the phosphonium salt and/or the ammonium salt is within the above range, the yield of the salt of the cyclic halosilane tends to improve.

The above method A is preferably carried out under the presence of a chelate ligand such as a polyether compound, a polythioether compound and a polydentate phosphine compound. When the cyclization coupling reaction of the method A is carried out under the presence of the chelate ligand, and the salt of the cyclic halosilane can be efficiently produced. In addition, the number of a hydrogen atom or a composition ratio in the obtained cyclic halosilane can be adjusted by appropriately selecting a kind of the chelate ligand to be used.

Examples of the polyether compound include, for example, dialkoxyalkanes such as 1,1-dimethoxyethane, 1,2-dimethoxyethane, 1,2-diethoxyethane, 1,2-dipropoxyethane, 1,2-diisopropoxyethane, 1,2-dibutoxyethane, 1,3-dimethoxypropane, 1,3-diethoxypropane, 1,3-dipropoxypropane, 1,3-diisopropoxypropane, 1,3-dibutoxypropane, 1,4-dimethoxybutane, 1,4-diethoxybutane, 1,4-dipropoxybutane, 1,4-diisopropoxybutane, and 1,4-dibutoxybutane; diaryloxyalkanes such as 1,2-diphenoxyethane, 1,3-diphenoxypropane, and 1,4-diphenoxybutane. Among these, 1,2-dimethoxyethane is particularly preferable.

Examples of the polythioether compound include those in which oxygen atom of the polyether compounds exemplified above is substituted with sulfur atom.

Examples of the polydentate phosphine compound include, for example, bis (dialkylphosphino) alkanes such 1,2-bis (dimethylphosphino) ethane, 1,2-bis (diethylphosphino) ethane, 1,2-bis (dipropylphosphino) ethane, 1,2-bis (dibutylphosphino) ethane, 1,3-bis (dimethylphosphino) propane, 1,3-bis (diethylphosphino) propane, 1,3-bis (dipropylphosphino) propane, 1,3-bis (dibutylphosphino) propane, 1,4-bis (dimethylphosphino) butane, 1,4-bis (diethylphosphino) butane, 1,4-bis (dipropylphosphino) butane, and 1,4-bis (dibutylphosphino) butane; bis (diarylphosphino) alkanes such as 1,2-bis (diphenylphosphino) ethane, 1,3-bis (diphenylphosphino) propane, 1,4-bis (diphenylphosphino) butane. Among them, 1,2-bis (diphenylphosphino) ethane is particularly preferable.

The used amount of the chelate ligand may be appropriately adjusted, and is preferably 0.01 mol or more, more preferably 0.05 mol or more, even more preferably 0.1 mol or more, and preferably 50 mol or less, more preferably 40 mol or less, even more preferably 30 mol or less, per 1 mol of the halosilane.

As the salt of the cyclic halosilane obtained in the method A, a compound represented by the following formula (13) is preferably used.

[Chemical Formula 5]

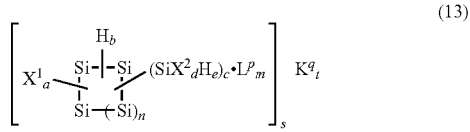

(13)

In the above formula (13), $X^1$ and $X^2$ each independently represent a halogen atom; L represents an anionic ligand; p is an integer of −2 to 0 as a valence of the ligand L; K represents a counter cation; q is an integer of 0 to 2 as a valence of the counter cation K; n is an integer of 0 to 5; a, b and c are integers of 0 to 2n+6, wherein a+b+c=2n+6 but a and c are not simultaneously 0; d is an integer of 0 to 3, wherein a and d are not simultaneously 0; e is an integer of 0 to 3, wherein d+e=3; m is a number of 1 to 2; s is an integer of 1 or more; and t is an integer of 1 or more.

The salt of the cyclic halosilane may be contacted and reacted with a Lewis acid to obtain a free cyclic halosilane. The free cyclic halosilane means noncomplex cyclic halosilanes such as $Si_5Cl_{10}$, $Si_6Cl_{12}$, or $Si_6Cl_{11}H$ in which a part of halogen atoms is substituted with hydrogen. Concretely, the corresponding free cyclic halosilane can be obtained by contacting a salt of a cyclic halosilane with a Lewis acid, making the Lewis acid electrophilically act on an anionic ligand contained in the salt of the cyclic halosilane, and extracting the anionic ligand from the salt of the cyclic halosilane to separate a counter cation.

The kind of the Lewis acid is not particularly restricted, and it is preferable to use a metal halide. Examples of the metal halide include metal chlorides, metal bromides, metal iodides and others, and from the viewpoint of reactivity and ease of control of the reaction, a metal chloride is preferably used. Examples of the metal element constituting the metal halide include group 13 elements such as boron, aluminum, gallium, indium and thallium; group 11 elements such as copper, silver and gold; group 4 elements such as titanium and zirconium; iron, zinc, calcium and others. Specific examples of the Lewis acid include boron halides such as boron trifluoride, boron trichloride and boron tribromide; aluminum halides such as aluminum chloride and aluminum bromide; gallium halides such as gallium chloride and gallium bromide; indium halides such as indium chloride and indium bromide; thallium halides such as thallium chloride and thallium bromide; copper halides such as copper chloride and copper bromide; silver halides such as silver chloride and silver bromide; gold halides such as gold chloride and gold bromide; titanium halides such as titanium chloride and titanium bromide; zirconium halides such as zirconium chloride and zirconium bromide; iron halides such as iron chloride and iron bromide; zinc halides such as zinc chloride and zinc bromide; calcium halides such as calcium chloride and calcium bromide; and others.

The used amount of the Lewis acid may be appropriately adjusted depending on the reactivity of the salt of the cyclic halosilane with the Lewis acid, and is, for example, preferably 0.5 mol or more, more preferably 1.5 mol or more, and preferably 20 mol or less, more preferably 10 mol or less, relative to 1 mol of the salt of the cyclic halosilane.

The reaction of the salt of the cyclic halosilane with the Lewis acid is preferably carried out in a solvent or a dispersion medium that is simply referred to as a solvent. Examples of the solvent (reaction solvent) used in the reaction include hydrocarbon solvents such as hexane, toluene; ether solvents such as diethyl ether, tetrahydrofuran, cyclopentyl methyl ether, diisopropyl ether and methyl tertiary-butyl ether; and others. These organic solvents may be used individually or two or more of them may be used in combination. In order to remove water and dissolved oxygen contained in the reaction solvent, it is preferable that the reaction solvent is subjected to purification such as distillation and dehydration prior to the reaction.

Reaction temperature upon carrying out the reaction of the salt of the cyclic halosilane with the Lewis acid may be appropriately adjusted depending on the reactivity, and is preferably −80° C. or higher, more preferably −50° C. or higher, even preferably −30° C. or higher, and preferably 200° C. or lower, more preferably 150° C. or lower, and even preferably 100° C. or lower.

Next, the above method B is explained.

In $XR_n$ of the above compound I, X is coordinated to the cyclic halosilane to form a neutral complex of the cyclic halosilane. When X is P or P=O, X is trivalent, and n representing the number of R is 3. Each R represents a substituted or unsubstituted alkyl group or aryl group and each R is the same or different. R is more preferably a substituted or unsubstituted aryl group. Examples of R as the alkyl group include linear, branched or cyclic alkyl groups, and preferably alkyl groups having 1 to 16 carbon atoms, such as linear alkyl groups such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group; cyclic alkyl groups such as a cyclopropyl group, a cyclobutyl group, a cyclopentyl group, a cyclohexyl group, and a cycloheptyl group. Preferable examples of R as the aryl group include aryl groups having about 6 to 18 carbon atoms, such as a phenyl group and a naphthyl group.

In $XR_n$ of the compound I, when X is N and the number of an amino group is 1 in $XR_n$, X is coordinated to the cyclic halosilane to form the neutral complex of the cyclic halosilane. When X is N, X is trivalent, and n representing the number of R is 3. Each R represents a substituted or unsubstituted alkyl group or aryl group and each R is the same or different. R is more preferably a substituted or unsubstituted alkyl group. Examples of R as the alkyl group include linear, branched or cyclic alkyl groups, and preferably alkyl groups having 1 to 16 carbon atoms, more preferably alkyl groups having 1 to 4 carbon atoms, such as a methyl group, an ethyl group, a propyl group and a butyl group, and even preferably alkyl groups having 1 to 3 carbon atoms. Preferable examples of R as the aryl group include aryl groups having about 6 to 18 carbon atoms, such as a phenyl group and a naphthyl group.

When X is P, P=O, or N in $XR_n$, the substituent that may be possessed by the alkyl group is, for example, an alkoxy group, an amino group, a cyano group, a carbonyl group and a sulfonyl group, and the substituent that may be possessed by the aryl group is, for example, an alkoxy group, an amino group, a cyano group, a carbonyl group and a sulfonyl group. Examples of the amino group include a dimethyl-amino group and a diethylamino group, and the number of the amino groups is not more than 1 in $XR_3$. This is intended to eliminate a tertiary polyamine. In the meantime, three Rs may be the same or different.

When X is S, S=O, or O, X is divalent, and n representing the number of R is 2. R is the same as R in the case where X is P, P=O, and R is preferably a substituted or unsubstituted alkyl group or aryl group. R is more preferably a substituted or unsubstituted aryl group. In addition, when X is CN, X is monovalent, and n representing the number of R is 1. R is the same as R in the case where X is P, P=O, and R is preferably a substituted or unsubstituted alkyl group or aryl group. R is more preferably a substituted or unsubstituted aryl group.

Specific examples of the compound I include a compound in which X is P, or P=O, such as triphenylphosphine ($PPh_3$), triphenylphosphine oxide ($Ph_3P$=O), tris(4-methoxyphenyl)phosphine ($P(MeOPh)_3$); a compound in which X is S=O such as dimethyl sulfoxide; and a compound in which X is CN such as p-tolunitrile (referred to as p-methylbenzonitrile).

The heterocyclic compound of the above (II) or the compound II is required to have an unshared electron pair in the ring, and the unshared electron pair coordinates to a cyclic halosilane to form a neutral complex of the cyclic halosilane. Examples of such a heterocyclic compound include at least one substituted or unsubstituted N-, O-, S- or P-containing heterocyclic compound that has an unshared electron pair in the ring. The substituents that may be possessed by the heterocyclic compound are the same as the substituents that may be possessed by R as an aryl group. Examples of the heterocyclic compound include pyridines, imidazoles, pyrazoles, oxazoles, thiazoles, imidazolines, pyrazines, thiophenes and furans, and specific examples thereof include N,N-dimethyl-4-aminopyridine, tetrahydrothiophene, and tetrahydrofuran.

Among the compound I and the compound II, a compound that is a liquid at a reaction temperature can also play a role of a solvent.

An amount of the compound I and the compound II may be determined appropriately. The compound I and the compound II is used in an amount of preferably 0.1 to 50 mol, and more preferably 0.5 to 3 mol, per 6 mol of a halosilane.

The neutral complex of a cyclic halosilane obtained in the above method B contains silicon atoms of 3 to 8, preferably 5 or 6, particularly preferably 6 of the halosilane as a raw material and a ring of which each of silicon atoms is bonded to each other, and the neutral complex of a cyclic silane is represented by the general formula $[Y]i[Si_mZ_{2m-a}H_a]$. In the above general formula, Y is the above compound I or the above compound II, each Z represents a halogen atom of any of Cl, Br, I and F and each Z is the same or different, 1 is 1 or 2, m is 3 to 8, preferably 5 or 6, particularly preferably 6, and a is 0 to 2m−1, preferably 0 to m.

The cyclization reaction of the halosilane in the methods A and B is preferably conducted by adding a tertiary amine. Thereby, produced hydrochloric acid can be neutralized by adding the tertiary amine.

Specific examples of the tertiary amine used in the cyclization reaction preferably include triethylamine, tripropylamine, tributylamine, trioctylamine, triisobutylamine, triisopentylamine, diethylmethylamine, diisopropylethylamine (DIPEA), dimethylbutylamine, dimethyl-2-ethylhexylamine, diisopropyl-2-ethylhexylamine, methyldioctylamine, and the like.

Here, the tertiary amine may be used individually or in combination of two or more thereof. The tertiary amine also includes one that is coordinated to a cyclic halosilane, and amines that are comparatively low in volume and are symmetry, such as diethylmethylamine and triethylamine, are considered to be comparatively efficiently coordinated. However, only with a tertiary amine represented by $XR_n$ of the above compound I, the yield of the neutral complex of a cyclic halosilane tends to decrease, and therefore, a compound I other than the tertiary amines is preferably used in combination.

The tertiary amine is used in an amount of preferably 0.5 to 4 mol relative to 1 mol of a halosilane, and particularly preferably the same mol as 1 mol of a halosilane.

Without limiting particularly, in at least one embodiment of the present disclosure, it is preferable that a tertiary polyamine having two or more carbon atoms and having three or more amino groups is not used. The use of the tertiary polyamine is not preferred in the viewpoint of the safety because a salt of a cyclic halosilane containing a silicon atom in the counter cation is produced and silane gas is generated in the storage and the reduction reaction.

The cyclization reaction of the halosilane in the above methods A and B can be conducted in an organic solvent as necessary. As the organic solvent, a solvent that does not prevent the cyclization reaction is preferred, and preferable examples thereof include hydrocarbon-based solvents (e.g. hexane, heptane, benzene, and toluene), halogenated hydrocarbon-based solvents (e.g. chloroform, dichloromethane and 1,2-dichloroethane), ether-based solvents (e.g. diethyl ether, tetrahydrofuran, cyclopentylmethyl ether, diisopropyl ether, and methyl tertiary-butyl ether) and aprotic polar solvents such as acetonitrile. Among these, the chlorinated hydrocarbon-based solvents such as chloroform, dichloromethane and 1,2-dichloroethane are preferred. These organic solvents may be used individually or in combination of two or more thereof.

The amount of the organic solvent to be used is not particularly limited, and it is generally preferred to be adjusted so that the concentration of the halosilane is preferably 0.5 to 10 mol/L, more preferably 0.8 to 8 mol/L, and further preferably 1 to 5 mol/L.

The reaction temperature in the cyclization reaction can be appropriately set according to the reactivity and is, for example, about 0 to 120° C., and preferably about 15 to 70° C. Further, the cyclization reaction is recommended to be conducted in an atmosphere of inert gas such as nitrogen.

After the cyclization reaction, a reaction solution containing the cyclic halosilane is preferably washed with a non-halogen solvent. In other words, after the cyclization reaction, a solution or dispersion containing the cyclic halosilane (the salt of the cyclic halosilane, the free cyclic halosilane, the neutral complex of a cyclic halosilane) is produced. In addition, the solution or the dispersion containing the cyclic halosilane is concentrated or filtered to prepare a solid of the cyclic halosilane, and the solid may be washed with the halogen solvents such as chloroform, dichloromethane, 1,2-dichloromethane, and the non-halogen solvents including aprotic polar solvents such as acetonitrile and hydrocarbon solvents such as hexane, heptane, benzene, tolune to purify the solid of the cyclic halosilane. By washing the cyclic halosilane with the non-halogen solvents, a content of impurities such as halogen elements contained in the hydrogenated silane composition tends to remarkably decrease. On the other hand, a content of normal hexasilane of impurities and a ring-opened product and the like tends to increase because a solid residue is increased at the reduction and the inner temperature is increased at the distillation in the case where the cyclic halosilane is not purified sufficiently with washing step.

Before washing with the non-halogen solvent, the cyclic halosilane is preferably washed with the halogen solvent. An amine hydrochloride can be removed by washing with the halogen solvent and the halogen solvent can be removed by washing with the non-halogen solvent. When the content of the halogen solvent contained in the solid or solution of the cyclic halosilane is decreased because the halogen solvent is reacted with various reducing agents, the yield of the hydrogenated silane tends to improve at the subsequent reduction reaction.

Washing with the halogen solvent and washing with the non-halogen solvent may be carried out one time or two or more times, respectively.

The cyclic halosilane can be obtained by the purification as a solid having high purity. In addition, the cyclic halosilane can be obtained as a composition containing the cyclic halosilane and impurities if necessary. The composition containing the cyclic halosilane contains the cyclic halosilane in a content of preferably 80% by mass or more, more preferably 90% by mass or more, and even preferably 95% by mass or more. The upper limit of the content of the cyclic halosilane is, for example, 99.99% by mass. Examples of the impurities include a solvent, a residue of the compound I or the compound II, a degradation product of the cyclic halosilane, a halosilane polymer, and the like. A content of the impurities in the composition containing the cyclic halosilane is preferably 20% by mass or less, more preferably 10% by mass or less, and even preferably 5% by mass or less, and the lower limit of the content of the impurities is, for example, 0.01% by mass.

The hydrogenated silane composition containing the cyclic hydrogenated silane can be prepared by reducing the cyclic halosilanes (the salt of the cyclic halosilane, the free cyclic halosilane, the neutral complex of the cyclic halosilane). The reduction step is preferably carried out under the presence of the reducing agent.

The reducing agent that can be used in the reduction step is not particularly limited, and one or more reducing agents selected from the group consisting of aluminum-based reducing agents and boron-based reducing agents are preferably used. Examples of the aluminum-based reducing agent include metal hydrides such as lithium aluminum hydride ($LiAlH_4$; LAH), diisobutyl aluminum hydride (DIBAL) and bis(2-methoxyethoxy) aluminum sodium hydride ("Red-Al" (registered trade mark of Sigma-Aldrich Corporation). Examples of the boron-based reducing agent include metal hydrides such as sodium borohydride and lithium triethylborohydride, and diborane. It is preferable that a metal hydride is used as the reducing agent. The reducing agents may be used individually or in combination of two or more thereof.

An amount of the reducing agent in the reduction step may be set appropriately, and an equivalent of a hydride of the reducing agent to one of silicon-halogen bond of the cyclic halosilane is preferably at least 0.9 equivalent or more. The amount of the reducing agent is adjusted to be more preferably 1.0 to 50 equivalents, even preferably 1.0 to 30 equivalents, particularly preferably 1.0 to 15 equivalents, and most preferably 1.0 to 2 equivalents. When the amount of the reducing agent is too much large, the productivity tends to decrease due to much times required for the post-treatment. On the other hand, when the amount of the reducing agent is too much small, the yield tends to decrease due to halogens without reducing.

A molar ratio of cyclic halosilane to reducing agent is preferably 1:3 to 5, and more preferably 1:3. When the molar ratio is over the above range, an amount of produced normal hexasilane of ring-opened products becomes large in some cases due to the excess progress of the reducing reaction. Further, a content of the linear hydrogenated silane of the hydrogenated silane composition tends to decrease by reducing an amount of the reducing agent used in the reducing reaction and the hydrogenated silane composition containing the cyclic hydrogenated silane having the branched silyl group in an appropriate content tends to be easily obtained.

Further, a Lewis acid catalyst may be used as a reduction auxiliary in combination with the above reducing agents in the reduction step. The Lewis acid catalyst may be metal halide compounds including metal chlorides such as aluminum chloride, titanium chloride, zinc chloride, tin chloride and iron chloride; metal bromides such as aluminum bromide, titanium bromide, zinc bromide, tin bromide and iron bromide; metal iodides such as aluminum iodide, titanium iodide, zinc iodide, tin iodide and iron iodide; and metal fluorides such as aluminum fluoride, titanium fluoride, zinc fluoride, tin fluoride and iron fluoride. These Lewis acid catalysts may be used individually or in combination of two or more thereof.

The reduction reaction can be carried out under the presence of an organic solvent as necessary. Examples of the organic solvent include hydrocarbon-based solvents such as hexane and toluene; and ether-based solvents such as diethyl ether, tetrahydrofuran, cyclopentyl methyl ether, diisopropyl ether, and methyl tertiary butyl ether. These organic solvents may be used individually or in combination of two or more thereof. The organic solvent solution obtained in the production of the cyclic halosilane may be directly used as an organic solvent solution in the reduction step, or an organic solvent may be distilled off from an organic solvent solution containing the cyclic halosilane and a newly added organic solvent may be used in the reduction step. Here, the organic solvent to be used in the reduction reaction is preferably subjected to purification such as distillation or dehydration before the reaction in order to remove water and dissolved oxygen contained therein.

An amount of the organic solvent to be used in the reduction reaction is adjusted such that the concentration of a cyclic halosilane is preferably 0.01 to 1 mol/L, more preferably to 0.02 to 0.7 mol/L, and further preferably to 0.03 to 0.5 mol/L. When the reaction is carried out in the above range, a content of the impurities such as halogen elements contained in the hydrogenated silane composition tends to remarkably decrease.

The reduction can be carried out by bringing the cyclic halosilane into contact with the reducing agent. When the cyclic halosilane is brought into contact with the reducing agent, the contact is preferably carried out under the presence of a solvent. In order to contact the cyclic halosilane with the reducing agent under the presence of the solvent, for example, (a) the reducing agent is directly added to a solution or a dispersion of the cyclic halosilane, (b) a solution or a dispersion obtained by dissolving or dispersing the reducing agent in the solvent is added to a solution or a dispersion of the cyclic halosilane, (c) the cyclic halosilane and the reducing agent are simultaneously or sequentially added to the solvent, and the like may be adopted. Among them, the embodiment (b) is particularly preferable.

Also, when the cyclic halosilane is brought into contact with the reducing agent, it is preferred that at least one of the solution or the dispersion of the cyclic halosilane and the solution or the dispersion of the reducing agent is added dropwise to the reaction system in which the reduction is carried out. One or both of the cyclic halosilane and the reducing agent are added dropwise as described above, whereby exothermic generated in the reduction reaction can be controlled by the dropwise addition rate or the like, thus an effect of leading to improved productivity can be obtained such that it is possible to downsize a condenser or the like.

The preferred embodiment when one or both of the cyclic halosilane and the reducing agent are added dropwise includes the following three embodiments. That is, A) an embodiment in which a solution or dispersion of the cyclic halosilane is charged in the reactor, and a solution or dispersion of the reducing agent is added dropwise thereto, B) an embodiment in which a solution or dispersion of the reducing agent is charged in the reactor, and a solution or dispersion of the cyclic halosilane is added dropwise thereto, and C) an embodiment in which a solution or dispersion of the cyclic halosilane and a solution or dispersion of the reducing agent are simultaneously or sequentially added dropwise to the reactor. Among them, the embodiment A) is preferable.

When one or both of the cyclic halosilane and the reducing agent are added dropwise by the embodiments A) to C), the concentration in the solution or dispersion containing the cyclic halosilane is preferably not less than 0.01 mol/L, more preferably not less than 0.02 mol/L, further preferably not less than 0.04 mol/L, and particularly preferably not less than 0.05 mol/L. When the concentration of the cyclic halosilane is too low, the amount of the solvent that needs to be removed by distillation when isolating the objective product is increased, and thus the productivity tends to be lowered. On the other hand, the concentration in the solution or dispersion containing the cyclic halosilane is preferably not more than 1 mol/L, more preferably not more than 0.8 mol/L, and further preferably not more than 0.5 mol/L.

The lower limit of the temperature during dropwise addition (specifically, the temperature of a solution or a dispersion during dropwise addition) is preferably −198° C., more preferably −160° C., further preferably −100° C. The upper limit of the temperature during dropwise addition is preferably +150° C., more preferably +100° C., further preferably +80° C., and particularly preferably +40° C. The temperature of a reaction container (reaction temperature) may be appropriately set according to the types of a cyclic halosilane and a reducing agent, and generally, the lower limit is preferably set to −198° C., more preferably −160° C., further preferably −100° C. The upper limit of the temperature of a reaction container (reaction solution) is preferably +150° C., more preferably +100° C., further preferably +80° C., and particularly preferably +40° C. When the reaction temperature is low, the decomposition or polymerization of an intermediate product or an object product can be suppressed, resulting in improvement of yield. The reaction time may be properly determined depending on the extent of reaction progress, and is usually not less than 10 minutes and not more than 72 hours, preferably not less than 1 hour and not more than 48 hours, and more preferably not less than 2 hours and not more than 24 hours.

As one example, a scheme example using in the above method B trichlorosilane as the halosilane, triphenylphosphine (PPh$_3$) as the compound I, N,N-diisopropylethylamine (DIPEA) as the tertiary amine is shown below.

[Chemical Formula 6]

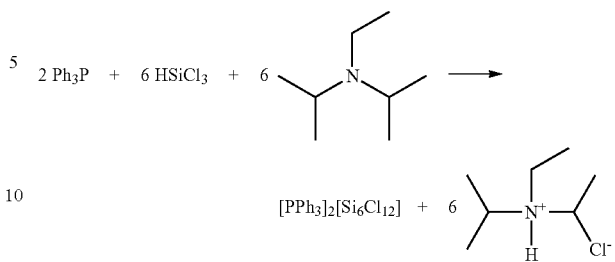

For example, when trichlorosilane is used as a starting material and triphenylphosphine (PPh$_3$) is used as the compound I, a complex containing 6-membered ring dodecachlorocyclohexasilane (neutral complex including triphenylphosphine coordinated to dodecachlorocyclohexasilane ([PPh$_3$]$_2$[Si$_6$Cl$_{12}$])) is generally produced as in the above scheme. This neutral complex of a cyclic halosilane does not contain any silicon atom other than the silicon atoms that form the ring structure, and therefore, in the reduction, alkylation or arylation, silane gas and organic monosilane are not generated, or silane gas and organic monosilane are decreased in a small amount even if silane gas and organic monosilane are generated.

The yield and yield constant of the neutral complex of a cyclic halosilane produced in the cyclization reaction can be calculated by a methylation reaction represented by the following scheme, in which the complex reacts quantitatively.

[Chemical Formula 7]

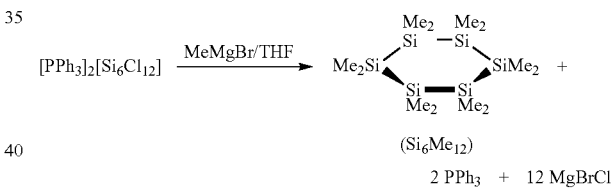

As a method for reducing a neutral complex of a cyclic halosilane (e.g. [PPh$_3$]$_2$[Si$_6$Cl$_{12}$]) to obtain a cyclic hydrogenated silane (e.g. cyclohexasilane), for example, when LiAlH$_4$ is used as a reducing agent, the scheme is represented as follows.

[Chemical Formula 8]

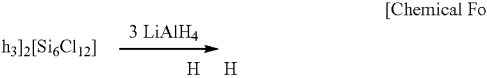

Cyclohexasilane (CHS)

Hereinafter, many methods for reducing a content of the linear hydrogenated silane and the cyclic hydrogenated silane having a branched structure of the hydrogenated silane composition are provided together the above method, and it is recommended that appropriate methods are combined based on the degree of decreasing the content of the linear hydrogenated silane and the cyclic hydrogenated silane having a branched structure. That is, in the case where the content of the linear hydrogenated silane and the cyclic hydrogenated silane having a branched structure cannot be decreased to an intended content in one method, multiple methods may be combined to decrease the content of the linear hydrogenated silane and the cyclic hydrogenated silane having a branched structure to a desired content.

It is preferred that the reduction reaction is usually carried out under an atmosphere of an inert gas such as nitrogen gas or argon gas.

The hydrogenated silane composition containing cyclohexasilane produced in the reduction reaction can be isolated by, for example, subjecting the reaction liquid obtained after the reduction to solid-liquid separation to separate a solid (impurities such as a salt of a by-product), distilling off the solvent under reduced pressure, to distill the hydrogenated silane composition.

As a method of solid-liquid separation, filtration is preferably employed for its simpleness, and the method is not limited thereto, and common solid-liquid separations such as centrifugation and decantation can be appropriately employed.

As mentioned above, a content of the linear hydrogenated silane and the cyclic hydrogenated silane having a branched structure of the hydrogenated silane composition tends to decrease, by washing the cyclic halosilane used in the reduction reaction with the non-halogen solvent or by carrying out solid-liquid separation of the hydrogenated silane composition containing the cyclic hydrogenated silane obtained in the reduction reaction at least two times.

For example, it is preferable that the solid-liquid separation is carried out at least two times after reducing the cyclic halosilane. For example, a solution or a solid containing the hydrogenated silane composition is subjected to solid-liquid separation (first separation), the solution containing the hydrogenated silane composition is preferably concentrated, the hydrocarbon solvent such as hexane is added as a solvent for dilution thereto, the hydrogenated silane composition is preferably concentrated, a precipitated solid is again subjected to solid-liquid separation (second separation), and operations from the first separation to the second separation may be repeated if necessary. After the first separation, the solvent dilution, the concentration, and the solid-liquid separation are more preferably carried out one or more times. These may be repeated multiple times. Thus, when the solid-liquid separation is carried out at least two times, byproducts of the linear hydrogenated silane and the cyclic hydrogenated silane having a branched structure can be controlled, and a content of the linear hydrogenated silane and the cyclic hydrogenated silane having a branched structure of the hydrogenated silane composition can be decreased. Thus, when the content of the linear hydrogenated silane and the cyclic hydrogenated silane having a branched structure is decreased, cyclohexasilane can be distilled without requiring useless energy.

The solid-liquid separation may be two times or three or times. The number of the solid-liquid separation is not limited particularly, and the upper limit of the solid-liquid separation is about five times in the viewpoint of the productivity.

Next, if necessary, a solution containing the hydrogenated silane composition obtained by the solid-liquid separation is concentrated, and the hydrogenated silane composition (preferably cyclohexasilane) having high concentration is preferably distilled. The distillation is preferably distillation under reduced pressure. A method for distilling under reduced pressure is not limited particularly, and the distillation under the reduced pressure may be carried out in known distillation column and may be carried out under light shielding condition. When the inner temperature of the distillation bottom is lowered by setting a heating temperature into a low temperature at the distillation, a content of the linear hydrogenated silane of the hydrogenated silane composition tends to decrease, and the hydrogenated silane composition containing the cyclic hydrogenated silane having the branched silyl group in an appropriate content tends to be easily obtained. The distillation is preferably carried out by dividing the whole fraction into multiple fractions and an appropriate fraction may be selected from obtained fractions, taking into the consideration of the content of the linear hydrogenated silane and the cyclic hydrogenated silane having a branched structure. In the case where many fractions corresponding to first fraction at the distillation are removed, a content of the linear hydrogenated silane of the hydrogenated silane composition tends to decrease, and the hydrogenated silane composition containing the cyclic hydrogenated silane having the branched silyl group in an appropriate content tends to be easily obtained.

One method for decreasing a content of normal hexasilane of the linear hydrogenated silane and silylcyclopentasilane of the cyclic hydrogenated silane having a branched structure of the hydrogenated silane composition includes a method for carrying out a distillation (particularly distillation under reduced pressure) two or more times. For example, a solution containing the hydrogenated silane composition is distilled under the reduced pressure, an appropriate fraction containing the cyclic hydrogenated silane (particularly cyclohexasilane) in an appropriate content is collected (first distillation), the collected fraction is again distilled under the reduced pressure to collect an appropriate fraction containing the cyclic hydrogenated silane (particularly cyclohexasilane) in an appropriate content (second distillation), and the second distillation may be repeated if necessary.

In the case where the distillation under reduced pressure is carried out two or more times, a temperature of a solution (an inner temperature) at the previous distillation under reduced pressure is preferably 25 to 65° C., more preferably 30 to 60° C., even preferably 55° C. or lower, and a temperature of a solution (an inner temperature) at the post distillation under reduced pressure is preferably 20 to 65° C., more preferably 30 to 60° C., and even preferably 50° C. or lower. Further, the temperature of the solution at the previous distillation under reduced pressure may be the same as the temperature of the solution at the post distillation under reduced pressure. When the inner temperature becomes high, normal hexasilane and the like are increased in some cases.

In the case where the distillation under reduced pressure is carried out two or more times, the previous distillation under reduced pressure may be carried out at preferably 5 to 400 Pa, more preferably 10 to 300 Pa, even preferably 50 to 250 Pa, even more preferably 100 to 220 Pa, and the post distillation under reduced pressure may be carried out at preferably 5 to 300 Pa, more preferably 10 to 200 Pa, even preferably 20 to 150 Pa, and even more preferably 30 to 120 Pa. The pressure of the previous distillation under reduced pressure may be the same as the pressure of the post distillation under reduced pressure. When the pressure is too much low, the impurities are hardly separated in some cases.

The temperature and the pressure of the previous distillation under reduced pressure are preferably higher than the temperature and the pressure of the post distillation under reduced pressure in the viewpoint of improving the purifying degree of the cyclic hydrogenated silane.

The pressure used in the first fraction of the post distillation under reduced pressure is preferably higher than the pressure used in the fractions other than the first fraction of the post distillation under reduced pressure in the viewpoint of removing the linear hydrogenated silane (for example normal hexasilane).

The distillation under reduced pressure may be carried out in batch because impurities having a higher boiling point than that of cyclohexasilane and impurities having a lower boiling point than that of cyclohexasilane are separated, and a content of the linear hydrogenated silane and the cyclic hydrogenated silane having a branched structure is decreased in the hydrogenated silane composition.

Fractions obtained in the distillation under reduced pressure (particularly second distillation under reduced pressure) may be divided into 1 to 20 fractions, 2 to 15 fractions, or 3 to 10 fractions.

It is preferable that fractions are obtained by dividing into multiple fractions while the temperature of the inner solution and the pressure are controlled within the above temperature and the above pressure, and it is more preferable that fractions are obtained by dividing into multiple fractions while a maximum pressure is gradually decreased within the above pressure range and a minimum temperature of the inner solution is gradually increased within the above temperature.

It is preferable that a first fraction is removed from all distilled fractions in the distillation under reduced pressure.

In at least one embodiment of the present disclosure, the storage stability of cyclohexasilane may be evaluated with the following formula in the case where the cyclohexasilane is restored at 20° C. for five months in a container (for example, SUS container, preferably surface-polished SUS container, more preferably electro-polished SUS container) having the light shielding property and the pressure resistance.

(GC purity (Y) of sample restored at 20° C. for five months/GC purity (X) of sample)×100  (Z)

A value of the formula (Z) is preferably 97.8% or more, more preferably 98.0% or more, even preferably 98.3% or more, and even more preferably 98.5% or more in the viewpoint of the storage stability for long time of cyclohexasilane. The upper limit of the formula (Z) may be 99.999%, or 99.99%.

In the at least one embodiment of the present disclosure, the hydrogenated silane composition is characterized in that a content ratio of normal hexasilane and silylcyclopentasilane to cyclohexasilane is decreased by 0.0020 or less on a mass basis. Therefore, the storage stability of the cyclohexasilane can be improved.

EXAMPLE

The present disclosure will be more specifically described below with reference to Examples, but the present disclosure is not limited to the following Examples, and can be implemented with appropriate modifications within the scope conforming to the purport of what is mentioned above and below herein. All of such modifications are included in the technical scope of the present disclosure.

Gas Chromatography (GC) Analysis Method
Measurement Method: GC FID method
Analyzing device: GC2014 manufactured by Shimadzu Corporation
Column: Agilent J&W GC column DB-5MS 0.25 μm (Film)×0.25 mm (Diam)×30 m (Length) (Agilent Technologies)
Temperature of vaporization chamber: 250° C.
Temperature of detector: 280° C.
Temperature elevating conditions: at 50° C. for 5 minutes, elevation of temperature up to 250° C. at a temperature elevating rate of 20° C./minute, elevation of temperature up to 280° C. at a temperature elevating rate of 10° C./minute, and at 280° C. for 10 minutes.

Production Example 1 (Production of Cyclic Halosilane)

The inside of a 3 L four-necked flask equipped with a thermometer, a condenser, a dropping funnel and a stirrer was replaced with nitrogen gas, and 155 g (0.591 mol) of triphenylphosphine as a coordination compound, 458 g (3.54 mol) of diisopropylethylamine as a basic compound and 1789 g of 1,2-dichloroethane as a solvent were then charged therein, to prepare a solution. Subsequently, while the solution in the flask was stirred, 481 g (3.54 mol) of trichlorosilane as a halosilane compound was slowly added dropwise from the dropping funnel in the condition of 25° C. After the completion of dropwise addition, the cyclization coupling reaction was carried out by continuously stirring the mixture for 2 hours and subsequently heating and stirring the mixture at 60° C. for 8 hours to give a homogeneous reaction solution. The resultant reaction solution was condensed and 7200 g of chloroform was added thereto, a mixture was stirred at room temperature for one hour, the mixture was washed and filtered, and filtered residue was dried under reduced pressure to give a crude product of the cyclic halosilane as a white solid.

Subsequently, to the white solid obtained in the above, five times volume of dehydrated hexane on a mass basis was added, a mixture was stirred for 24 hours at room temperature, washed and filtered. The resultant filtered residue was again subjected to washing and filtration using hexane in the same manner as the above, and the resultant filtered residue was dried under reduced pressure to obtain a purified cyclic halosilane compound (bis(triphenylphosphine)dodecachlorocyclohexasilane ([Ph$_3$P]$_2$[Si$_6$Cl$_{12}$])). All steps of from washing to drying were carried out in nitrogen atmosphere. When the resultant purified product was objected to gas chromatography, 1% by mass of chloroform as halogenated hydrocarbon and 1% by mass of amine salt (amine hydrochloride) were contained in the purified product.

Example 1-1 (Production of Crude Cyclic Hydrogenated Silane)

To a 10 L flask under nitrogen atmosphere, 1099 g of the purified cyclic halosilane obtained in the above Production Example 1 and 5226 g of diethyl ether were charged and stirred at −40° C. Then, 2005 g of a 1M diethyl ether solution of LiAlH$_4$ as a reducing agent was added dropwise from the dropping funnel. After the completion of the addition, a solution was stirred at −40° C. for three hours, and the reduction reaction was carried out. Then, a reaction solution was heated to a room temperature, the solution was subjected to solid-liquid separation by decantation under nitrogen atmosphere, diethyl ether solvent was distilled off under reduced pressure from 6974 g of the resultant solution, and 3810 g of dehydrated hexane was added thereto. After the addition of the hexane, diethyl ether and hexane were distilled off under reduced pressure to concentrate the solution, and the solution was subjected to solid-liquid separation by the filtration at 0° C. to remove a precipitated solid. After a solvent was further distilled off from a filtrate, the resultant solution was filtered to obtain 160 g of crude cyclohexasilane as a filtrate.

Example 1-2 (Production of Purified Cyclic Hydrogenated Silane)

Under light shielding condition, 139 g of crude cyclohexasilane was subjected to a distillation under reduced pressure (conditions: temperature of inner solution of 41 to 53° C., a pressure of 120 to 200 Pa) using a distillation equipment which was made of glass and was equipped with a vigreux column, a flask, a fractionating column, a condenser (a cooling pipe), and a receiver to 51 g of roughly distilled cyclohexasilane (fractions 1 to 5, GC purify (Area %): 95.4% to 98.1%). Then, 114 g of roughly distilled cyclohexasilane was subjected to a distillation under reduced pressure (conditions: temperature of inner solution of 35 to 43° C., a pressure of 60 to 97 Pa) using a distillation equipment which was made of glass and was equipped with a vigreux column, a flask, a fractionating column, a condenser (a cooling pipe), and a receiver under light shielding condition to 106 g of two times-distilled cyclohexasilane (fractions 1 to 5, GC purify (Area %): 98.0% to 99.1%).

According to measured results of gas chromatography, contents of normal hexasilane (n-HS) of the linear hydrogenated silane and silylcyclopentasilane (Si-CPS) of the cyclic hydrogenated silane having a branched structure of the two times-distilled cyclohexasilane are shown in Table 1. In addition, conditions for obtaining each fractions are also shown in Table 1.

TABLE 1

| Two-times distilled cyclo-hexasilane | Pres-sure (Pa) | Temperature of inner solution (° C.) | CHS (area-%) | n-HS (area-%) | Si-CPS (area-%) | (n-HS + Si-CPS)/CHS (area-%) |
| --- | --- | --- | --- | --- | --- | --- |
| Fraction 1 | 74~97 | 35 | 98.9 | 0.21 | 0.09 | 0.0030 |
| Fraction 2 | 65~77 | 36 | 99.0 | 0.15 | 0.08 | 0.0023 |
| Fraction 3 | 62~69 | 35~36 | 99.1 | 0.11 | 0.09 | 0.0020 |
| Fraction 4 | 60~71 | 36~39 | 99.0 | 0.03 | 0.08 | 0.0011 |
| Fraction 5 | 65~80 | 40~43 | 98.0 | 0.004 | 0.07 | 0.0008 |

Test Example 1 (Evaluation of Storage Stability)

For two times-distilled cyclohexasilane obtained in Example 1-2, the fraction 4 of Lot.A (GC purity (Area %) 99.0%) was charged in a stainless (SUS) container having a pressure resistance and stored at a room temperature (20° C.) within a glove box under nitrogen atmosphere. At the time when five months were passed, GC purity of cyclohexasilane was measured using a gas chromatography device, and GC purity was 97.8%. In addition, $^{29}$Si-NMR was measured for two times-distilled cyclohexasilane and the production of the polymer component was not observed.

For another two times-distilled cyclohexasilane obtained in Example 1-2, the fraction 4 of Lot.B (GC purity (Area %) 99.0%) was charged in a stainless (SUS) container having a pressure resistance and stored at a room temperature (20° C.) within a glove box under nitrogen atmosphere. At the time when five months were passed, GC purity of cyclohexasilane was measured using a gas chromatography device, and GC purity was 98.1%. In addition, $^{29}$Si-NMR was measured for two times-distilled cyclohexasilane and the production of the polymer component was not observed.

On the other hand, for two times-distilled cyclohexasilane described in Table 1, the fraction 1 of Lot.C (GC purity (Area %) 98.9%) was charged in a stainless (SUS) container having a pressure resistance and stored at a room temperature (20° C.) within a glove box under nitrogen atmosphere. At the time when five months were passed, GC purity of cyclohexasilane was measured using a gas chromatography device, and GC purity was 96.6%. In addition, $^{29}$Si-NMR was measured for two times-distilled cyclohexasilane and the production of the polymer component was observed. These results are shown in Table 2.

TABLE 2

| | Content ratio of (n-HS + Si-CPS)/CHS | Initial purity (%) | Purity after five months (%) | Production of polymer |
| --- | --- | --- | --- | --- |
| Lot.A (Example) | 0.0011 | 99.0 | 97.8 | No |
| Lot.B (Example) | 0.0007 | 99.0 | 98.1 | No |
| Lot.C (Comparative Example) | 0.0030 | 98.9 | 96.6 | Yes |

Example 2-1 (Production of Crude Cyclic Hydrogenated Silane)

To a 10 L flask under nitrogen atmosphere in the same manner as in Example 1-1, 1099 g of the purified cyclic halosilane obtained in the above Production Example 1 and 5217 g of diethyl ether were charged and stirred at −40° C. Then, 2000 g of a 1M diethyl ether solution of LiAlH$_4$ as a reducing agent was added dropwise from the dropping funnel. After the completion of the addition, a solution was stirred at −40° C. for three hours, and the reduction reaction was carried out. Then, a reaction solution was heated to a room temperature, the solution was subjected to solid-liquid separation by decantation under nitrogen atmosphere, diethyl ether solvent was distilled off under reduced pressure from 6273 g of the resultant solution, and 3344 g of dehydrated hexane was added thereto. After the addition of the hexane, diethyl ether and hexane were distilled off under reduced pressure to concentrate the solution, and the solution was subjected to solid-liquid separation by the filtration at 0° C. to remove a precipitated solid. After a solvent was further distilled off from a filtrate, the resultant solution was filtered to obtain 72 g of crude cyclohexasilane as a filtrate.

Example 2-2 (Production of Purified Cyclic Hydrogenated Silane)

Under light shielding condition, 71 g of crude cyclohexasilane was subjected to a distillation under reduced pressure (conditions: temperature of inner solution of 40 to 50° C., a pressure of 130 to 190 Pa) using a distillation equipment which was made of glass and was equipped with a vigreux column, a flask, a fractionating column, a condenser (a cooling pipe), and a receiver to 50 g of roughly distilled cyclohexasilane (fractions 1 to 5, GC purify (Area %): 97.3% to 99.2%). Then, 44 g of roughly distilled cyclohexasilane was subjected to a distillation under reduced pressure (conditions: temperature of inner solution of 33 to 42° C., a pressure of 63 to 73 Pa) using a distillation equipment which was made of glass and was equipped with a vigreux column, a flask, a fractionating column, a condenser (a cooling pipe), and a receiver under light shielding condition to 41 g of two times-distilled cyclohexasilane (fractions 1 to 5, GC purify (Area %): 99.1% to 99.6%). According to measured results of gas chromatography, contents of normal hexasilane (n-HS) of the linear hydrogenated silane and silylcyclopentasilane (Si-CPS) of the cyclic hydrogenated silane having a branched structure of the two times-distilled cyclohexasilane are shown in Table 3. In addition, conditions for obtaining each fractions are also shown in Table 3.

TABLE 3

| Two times-distilled cyclo-hexasilane | Pressure (Pa) | Temperature of inner solution (° C.) | CHS (area-%) | n-HS (area-%) | Si-CPS (area-%) | (n-HS + Si-CPS)/CHS (area-%) |
|---|---|---|---|---|---|---|
| Fraction 1 | 68-73 | 33-34 | 99.1 | 0.23 | 0.06 | 0.0029 |
| Fraction 2 | 71-75 | 35-36 | 99.6 | 0.11 | 0.06 | 0.0017 |
| Fraction 3 | 65-69 | 35-36 | 99.6 | 0.06 | 0.05 | 0.0010 |
| Fraction 4 | 63-70 | 34-37 | 99.6 | 0.01 | 0.04 | 0.0005 |
| Fraction 5 | 62 | 37-42 | 99.1 | 0.01 | 0.04 | 0.0004 |

Test Example 2 (Evaluation of Storage Stability)

For two times-distilled cyclohexasilane obtained in Example 2-2, the fraction 4 of Lot.D (GC purity (Area %) 99.6%) was charged in a stainless (SUS) container having a pressure resistance and stored at a room temperature (20° C.) within a glove box under nitrogen atmosphere. At the time when five months were passed, GC purity of cyclohexasilane was measured using a gas chromatography device, and GC purity was 99.2%. In addition, $^{29}$Si-NMR was measured for two times-distilled cyclohexasilane and the production of the polymer component was not observed.

In addition, the fraction 4 of Lot.E (GC purity (Area %) 99.6%) of two times-distilled cyclohexasilane obtained in the same manner as in Example 2-2 was charged in a stainless (SUS) container having a pressure resistance and stored at a room temperature (20° C.) within a glove box under nitrogen atmosphere. At the time when five months were passed, GC purity of cyclohexasilane was measured using a gas chromatography device, and GC purity was 98.7%. In addition, $^{29}$Si-NMR was measured for two times-distilled cyclohexasilane and the production of the polymer component was not observed.

On the other hand, the fraction 1 of Lot.F (GC purity (Area %) 99.1%) of two times-distilled cyclohexasilane described in Table 3 was charged in a stainless (SUS) container having a pressure resistance and stored at a room temperature (20° C.) within a glove box under nitrogen atmosphere. At the time when five months were passed, GC purity of cyclohexasilane was measured using a gas chromatography device, and GC purity was 97.0%. In addition, $^{29}$Si-NMR was measured for two times-distilled cyclohexasilane and the production of the polymer component was observed. These results are shown in Table 4.

TABLE 4

| | Content ratio of (n-HS + Si-CPS)/CHS | Initial purity (%) | Purity after five months (%) | Production of polymer |
|---|---|---|---|---|
| Lot.D (Example) | 0.0005 | 99.6 | 99.2 | No |
| Lot.E (Example) | 0.0008 | 99.6 | 98.7 | No |
| Lot.F (Comparative Example) | 0.0029 | 99.1 | 97.0 | Yes |

The invention claimed is:

1. A hydrogenated silane composition, wherein a content ratio of linear hydrogenated hexasilane and silylcyclopentasilane to cyclohexasilane is 0.00001 or more and 0.0020 or less on a mass basis.

2. The hydrogenated silane composition according to claim 1, wherein a content of silylcyclopentasilane is 0.0001 to 0.5% by mass per 100% by mass of the hydrogenated silane composition.

3. The hydrogenated silane composition according to claim 1, wherein a content of linear hydrogenated hexasilane is 0.5% by mass or less per 100% by mass of the hydrogenated silane composition.

4. The hydrogenated silane composition according to claim 2, wherein a content of linear hydrogenated hexasilane is 0.5% by mass or less per 100% by mass of the hydrogenated silane composition.

5. The hydrogenated silane composition according to claim 1, wherein a content of cyclohexasilane is 97% by mass or more per 100% by mass of the hydrogenated silane composition.

6. The hydrogenated silane composition according to claim 2, wherein a content of cyclohexasilane is 97% by mass or more per 100% by mass of the hydrogenated silane composition.

7. The hydrogenated silane composition according to claim 3, wherein a content of cyclohexasilane is 97% by mass or more per 100% by mass of the hydrogenated silane composition.

8. The hydrogenated silane composition according to claim 4, wherein a content of cyclohexasilane is 97% by mass or more per 100% by mass of the hydrogenated silane composition.

* * * * *